United States Patent [19]

Harmony

[11] 4,072,270
[45] Feb. 7, 1978

[54] SHOWER HEAD AERATOR
[75] Inventor: Richard C. Harmony, Tucson, Ariz.
[73] Assignee: Harmony Emitter Company, Inc., Tucson, Ariz.
[21] Appl. No.: 716,588
[22] Filed: Aug. 23, 1976
[51] Int. Cl.² ............................................. E03C 1/084
[52] U.S. Cl. ............................. 239/428.5; 239/419.5; 239/432
[58] Field of Search ................. 239/419.5, 428.5, 432, 239/498, 518

[56] References Cited
U.S. PATENT DOCUMENTS

| | | | |
|---|---|---|---|
| 2,510,396 | 6/1950 | Goodrie | 293/428.5 |
| 2,778,620 | 1/1957 | Goodrie | 239/428.5 |
| 3,286,935 | 11/1966 | Corlett et al. | 239/428.5 |
| 3,341,132 | 9/1967 | Parkison | 239/428.5 X |
| 3,884,418 | 5/1975 | Ritzenthaler et al. | 239/428.5 |

Primary Examiner—Robert W. Saifer
Attorney, Agent, or Firm—Cahill, Sutton & Thomas

[57] ABSTRACT

An aerator inserted intermediate a water pipe and a shower head introduces air for mixture with the water within the shower head and produces the same physiological effect as a standard shower head while effecting a substantial reduction in water useage. The aerator includes conduit means for conveying water from the water pipe to the shower head. The conveyed water and the drawn in ambient air are mixed by the normally occurring water turbulence within the shower head prior to ejection of the mixture through the shower head nozzles.

4 Claims, 4 Drawing Figures

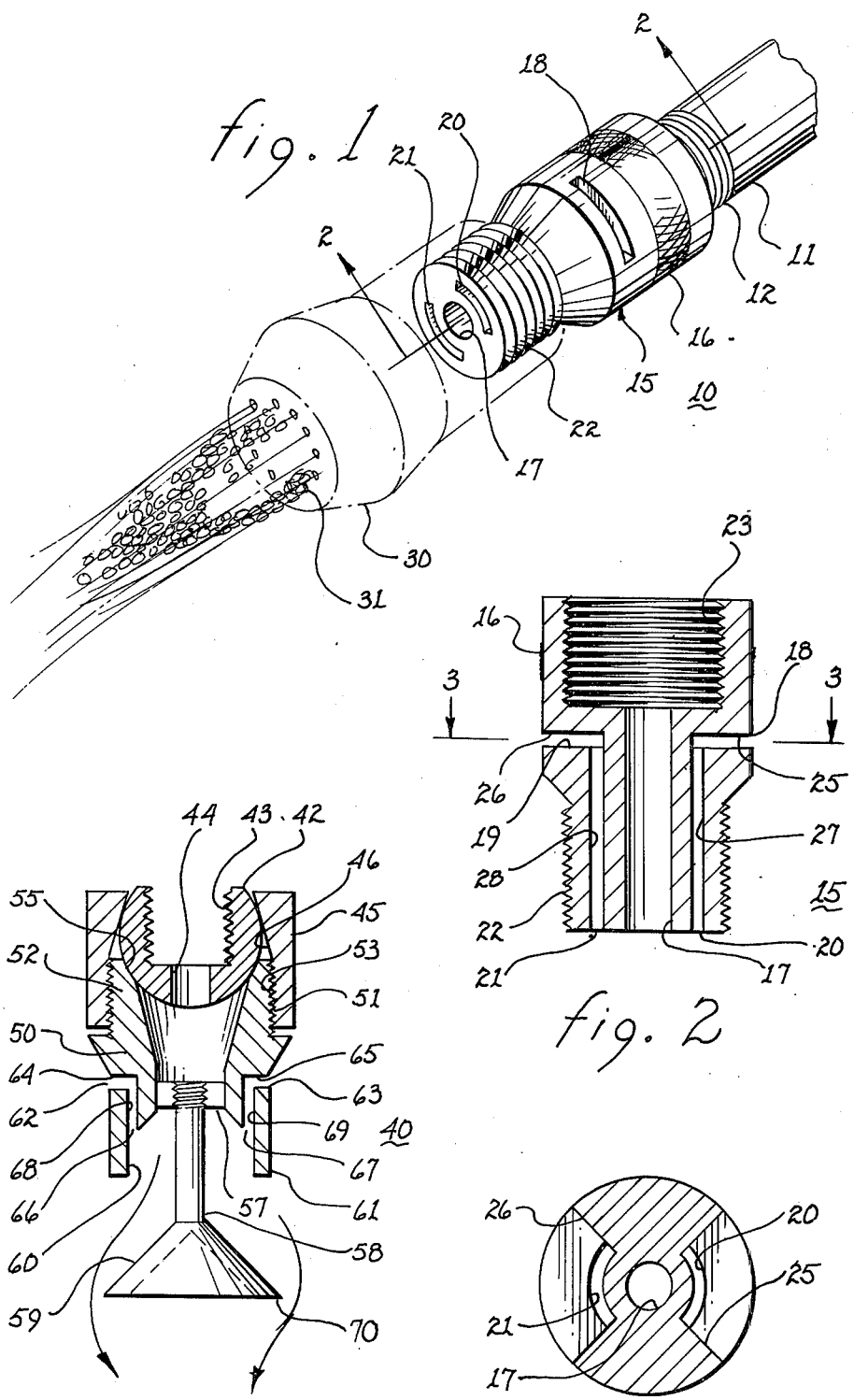

SHOWER HEAD AERATOR

The present invention relates to shower heads and, more particularly, to shower head aerators.

Aerators which introduce a stream of air for mixing with water or some other discharged liquid are known. Of the type most commonly known are those attached to the faucet for a kitchen sink. U.S. Pat. No. 3,633,824 describes such a device. Herein, a plurality of individual jets collectively draw air into a chamber wherein, as the jets pass through a plurality of screens, the air is mixed with each jet of water. U.S. Pat. No. 2,998,928, also describes a water and air mixing device of the type most usually found attached to the faucets for kitchen sinks. Herein, air is introduced to preformed jets of water. When the water jets pass through a mesh or screen, they combine with the air to produce a mixture of water and air.

Other devices for mixing air with water jets have also been developed over the years. In example, U.S. Pat. No. 2,447,123, describes a device wherein air under pressure is introduced to a mixing chamber. Simultaneously, a plurality of jets of water are directed to impinge upon a water deflecting surface. After deflection of the water, the water mixes with the introduced air to produce an output jet of water intermixed with air bubbles. U.S. Pat. No. 3,322,352, describes a shower head wherein a plurality of jets of water strike a spherical surface contained within a cylindrical chamber. A passageway, interconnecting the cylindrical chamber with ambient air, affords a passageway for introducing air. The air and the deflected jets of water mix within a mixing chamber and the mixture is ejected through each of a plurality of nozzles of the shower head. U.S. Pat. No. 3,708,125, describes a submerged device for creating a jet of water and air mixture wherein the principles of cavitation are employed to introduce free air. U.S. Pat. No. 3,430,823, illustrates a device wherein a jet of fluid is directed through a chamber vented to the atmosphere. Passage of the jet of fluid through the chamber tends to draw air into the chamber and develop a jet of fluid and air mixture at an output orifice. U.S. Pat. No. 3,796,377, describes a device having a pair of stacked apertured plates defining two sets of fluid jets. The first set of fluid jets draw air into a mixing chamber intermediate the plates. The fluid and bubbles of air are mixed in the mixing chamber and ejected through the second set of jets.

All of the above described devices require use of special mixing apparatus for obtaining a mixture of air and water, whether it be a mesh, screen, or specially constructed deflection means within a mixing chamber; alternatively, a first set of jets of water must be created in order to effect mixing of air and water prior to discharge of the mixture through a second set of jets.

It is therefore a primary object of the present invention to provide an aerator compatible with standard shower heads for creating a mixture of air and water.

Another object of the present invention is to provide an aerator disposed intermediate the water supply pipe and a standard shower head unit.

Still another object of the present invention is to provide a low cost shower head aerator.

Yet another object of the present invention is to provide a shower head aerator which reduces the quantity of water normally used for showers while retaining the physiological effect of an equivalent shower.

A further object of the present invention is to provide a shower head aerator readily installable by the ultimate user.

A still further object of the present invention is to provide an aerated shower head which produces a converging stream of aerated water.

A yet further object of the present invention is to provide a replaceable shower head which provides all of the physiological benefits of a shower head while reducing the consumption of water.

These and other objects of the present invention will become apparent to those skilled in the art as the description thereof proceeds.

The present invention may be described with greater specificity and clarity with reference to the following drawings, in which:

FIG. 1 is a perspective view of an aerator installed intermediate a source of water and a standard shower head.

FIG. 2 is a cross-sectional view of the aerator illustrated in FIG. 1 and taken along lines 2—2.

FIG. 3 is a cross-sectional view of the aerator illustrated in FIG. 2 and taken along lines 3—3.

FIG. 4 is a cross-sectional view of a shower head incorporating apparatus for aerating the discharged water.

A shower head assembly 10 incorporating the present invention is illustrated in FIG. 1. A conventional water pipe 11, of the type and dimensions presently found in shower stalls and having a conventionally threaded end 12 supplies water to the shower head assembly. Aerator 15 is threadedly attached to pipe 11 through a threaded socket disposed at one end of the aerator. To simplify and facilitate installation of aerator 15, an annular segment of the cylindrical surface of the aerator may be knurled, as indicated by numeral 16. A conventional shower head 30 is threadedly secured to threaded stud 22 of the aerator. As is well known, the shower head includes a plurality of nozzles 31 which may be fixed or adjustable depending upon the characteristics of the shower head. These nozzles develop the jets of water ejected from the shower head.

Turning now to the aerator, a conduit 17 is disposed internal to aerator 15 and conveys a flow of water from within pipe 11 through the aerator. Air inlets, such as inlet 18, is disposed within the cylindrical surface of aerator 15. A pair of outlets 20 and 21 are disposed in the longitudinal end surface of threaded stud 22. Outlet 20 is in fluid communication with inlet 18 through a passageway internal to the aerator and outlet 21 is in communication with a further inlet (not shown in FIG. 1).

To install aerator 15 within any shower stall, the existing shower head is threadedly disconnected from pipe 11 protruding from a wall of the shower stall. The aerator is then threadedly engaged with the pipe and the existing shower head is threadedly engaged with the aerator. When the shower valve is opened, water flows through pipe 11 and through conduit 17 of aerator 15 into a chamber within the shower head. The water within the shower head chamber is ejected through nozzles 31 in the form of a spray or a plurality of jets of water. The passage of water from conduit 17 and through the chamber within the shower head establishes, in accordance with the Bernoulli, or venturi principle, a low pressure environment within the shower head. The low pressure environment tends to draw ambient air through outlets 20 and 21. The drawn air mixes with the water within the shower head due to the turbulent nature of the flow therein and is ultimately ejected through nozzles 31.

Because the ejected jets of water are mixture of air and water, the spray striking a bather will not have the conventional sting of sharply defined jets of water. Instead, the spray will tend to be "softer" and produce a physiological massaging effect which is very pleasant. Aside from the physiological benefits, the amount of water seemingly necessary to provide the bather with a shower to which he has become accustomed to, consumes approximately one-half of the normal water useage. Thereby, aerator 15 can effect a water savings of approximately 50 percent and yet require no change in habits by the bather nor in any manner curtail or restrict the habits developed from a lifetime of showers.

The structural details of aerator 15 will be described with greater specificity with reference to FIGS. 2 and 3. Aerator 15 is developed as a cylindrically shaped unit having a threaded socket 23 for threadedly engaging pipe 11. Conduit 17 extends from socket 23 through stud 22 for the purpose of conveying water from pipe 11 to shower head 30. Inlets 18 and 19 are truncated pie-shaped cavities 25, 26, extending inwardly from the periphery of aerator 15 and lie within a plane perpendicular to the longitudinal axis of the aerator. Outlets 20 and 21 are developed by segmented annular passageways 27, 28 radially displaced from the longitudinal axis of the aerator and interconnect with respective ones of cavities 25 and 26. It is appreicated that the other configurations of the cavities and the passageways may be developed; however, the passageways and cavities illustrated are relatively inexpensively formed with aerator 15 and their configurations permit manufacture of the aerator by mass production techniques.

FIG. 4 illustrates a variant 40 of the present invention, which variant incorporates the function of the above described aerator and produces a converging stream of air and water mixture. The variant is attached to a shower stall water outlet pipe, such as pipe 11 illustrated in FIG. 1, by a partially spherically shaped element 42. The element includes a threaded socket 43 for engaging the threads of the water pipe. A conduit 44 conveys the water flowing from the socket through element 42. A collar 45 includes an inclined plane 46 for engagement with a circular point contact upon the upper half of element 42. Hollow aerator 50 includes threads 51 disposed about a cylindrical boss 52 of the aerator. Threads 51 engage similar threads 53 disposed upon the inner cylindrical surface of collar 45. An annular concave surface 55 is developed about the inner surface of boss 52 for engagement with a peripheral segment of the spherical surface of element 42.

A spoked retainer 57 is disposed interior to aerator 50 for threadedly supporting a stud 58 extending upwardly from a water deflector 59. The exact configuration of retainer 57 may be varied provided only that it includes passageways to accommodate the flow of water therethrough from the interior of aerator 50 and includes support means for supporting stud 58. Deflector 59 is a cone-shaped member. The lower diameter of the deflector is at least as great as the diameter of outlet 60 of aerator 50 in order to insure that all water discharged from the aerator impinges upon the deflector.

Air is introduced within the aerator through inlets 62 and 63. These inlets are disposed in the lateral surface of the aerator and are defined by laterally oriented cavities 64 and 65, which cavities may be configured as truncated pie-shaped cavities similar to those illustrated in FIGS. 2 and 3. Outlets 66 and 67 are defined by segmented annular passageways 68 and 69 extending longitudinally downwardly from the radially inward extremities of cavities 64 and 65; these passageways are similar to those illustrated in FIGS. 2 and 3.

In operation, on commencement of water flow through the interior of aerator 50, through retainer 57 and within skirt 60, a low pressure environment is established in accordance with the venturi principle. The low pressure environment draws ambient air through inlets 62 and 63, cavities 64 and 65, passageways 68 and 69 and outlets 66 and 67. The drawn in air is mixed with the adjacent flow of water by the turbulating action of the water flow intermediate retainer 57 and the surface of deflector 59. Hence, a mixture of water and air flows downwardly along the increasing cone-shaped surface area of deflector 59. Because the surface area of deflector 59 increases downwardly, the thickness of the water flow therealong diminishes proportionate to the increase in surface area until the thickness is at a minimum point along lower edge 68 of the deflector. Thereafter, the water flow will be downwardly in a circular sheet-like configuration. The sheet-like flow of water will tend to create, because of the venturi principle, a low pressure area centered upon and immediately below deflector 59. This low pressure area, in combination with the ambient air pressure will tend to cause the sheet-like flow of water to converge, as indicated by the arrows in FIG. 4. The converging water will tend to remain in the form of a solid stream of water until ultimately deflected by an interfering surface.

For reasons stated above, the sheet of water is in fact a mixture of air and water. This mixture, upon striking the body of a person taking a shower, will give the physiological effect of being "soft" and yet have the massaging and cleansing effect of a shower. By employing a mixture of air and water rather than water alone, the amount of water useage can be reduced by approximately 50 percent and yet still retain all of the benefits so cherished by those who prefer showers to baths. Thereby, variant 40 retains all of the massaging and cleansing benefits of a shower head dispensing a uniform stream of water and yet requires 50 percent less water to achieve the same result.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A shower head apparatus for mixing ambient air with water flowing from a source of water under pressure, said apparatus comprising in combination:
   a. a cylindrically shaped hollow aerator having an internal concentrically located water outlet in fluid communication with the source of water for introducing air into the water flowing through said aerator, said aerator comprising:
      i. at least one inlet for receiving ambient air;
      ii. at least one outlet for discharging ambient air into said aerator;
      iii. a passageway for interconnecting said inlet and said outlet;

iv. an open ended chamber in communication with each said air outlet and the water outlet for receiving and turbulating both air and water;
v. a further outlet disposed at the downstream open end of said chamber for discharging the water and air flowing into said chamber;
b. cone shaped deflector means for radially deflecting the air and water discharged from said further outlet adjacent the surface of said cone shaped deflector and developing a converging circular shroud of water and air mixture downstream of said cone shaped deflector means; and
c. a stud extending from a point within said aerator through said chamber to a point downstream of said discharge outlet for supporting the apex of said cone shaped deflector means, said stud being concentrically located with respect to the longitudinal axis of said chamber to position the apex of said cone shaped deflector means at the center of the discharged mixture of air and water;
d. a retainer disposed within said aerator for securing said stud concentric with said aerator;

whereby, the water mixes with the air within said chamber and during subsequent impingement of the flow of water and air discharged from said chamber upon said deflector and is radially distributed along the surface of said cone shaped deflector.

2. The apparatus as set forth in claim 1 wherein each said air inlet is radially oriented with respect to the longitudinal axis of said chamber and wherein each said passageway extending from one of said air inlets is a straight passageway oriented parallel to the longitudinal axis of said chamber.

3. The apparatus as set forth in claim 2 wherein each said air outlet is oriented parallel to the longitudinal axis of said chamber.

4. The apparatus as set forth in claim 3 wherein said chamber includes a smooth surfaced circular shroud extending downstream from said air outlets.

* * * * *